(12) United States Patent
Lee et al.

(10) Patent No.: US 7,556,680 B2
(45) Date of Patent: *Jul. 7, 2009

(54) INK COMPOSITION

(75) Inventors: Jong-in Lee, Suwon-si (KR); Seung-min Ryu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 428 days.

This patent is subject to a terminal disclaimer.

(21) Appl. No.: 11/108,109

(22) Filed: Apr. 18, 2005

(65) Prior Publication Data

US 2005/0268816 A1     Dec. 8, 2005

(30) Foreign Application Priority Data

Jun. 4, 2004     (KR)     ............ 10-2004-0040901

(51) Int. Cl.
  *C09D 11/02*     (2006.01)
  *B41J 2/01*     (2006.01)
(52) U.S. Cl. ............ 106/31.47; 106/31.77; 106/31.49; 106/31.78; 106/31.58; 106/31.86; 106/31.87; 347/100
(58) Field of Classification Search ............ 106/31.47, 106/31.77, 31.49, 31.78, 31.58, 31.86, 31.87; 347/100
See application file for complete search history.

(56) References Cited

U.S. PATENT DOCUMENTS

| | | | |
|---|---|---|---|
| 5,205,861 A | 4/1993 | Matrick | 106/31.47 |
| 5,580,373 A * | 12/1996 | Lane et al. | 524/100 |
| 5,972,431 A * | 10/1999 | Marsella et al. | 427/384 |
| 6,102,998 A | 8/2000 | Iu et al. | 106/31.58 |
| 6,582,501 B2 * | 6/2003 | Ryu et al. | 106/31.46 |
| 7,125,444 B2 * | 10/2006 | Taguchi et al. | 106/31.46 |
| 7,303,272 B2 * | 12/2007 | Taguchi et al. | 347/100 |
| 2005/0098063 A1* | 5/2005 | Lee et al. | 106/31.43 |
| 2006/0117994 A1* | 6/2006 | Ryu et al. | 106/31.58 |

FOREIGN PATENT DOCUMENTS

| | | |
|---|---|---|
| JP | 56-118470 | 9/1981 |
| JP | 58-198570 | 11/1983 |

(Continued)

OTHER PUBLICATIONS

Korean Patent Office Action for corresponding Korean Patent Application No. 10-2004-0040901 dated Dec. 26, 2005.

*Primary Examiner*—Helene Klemanski
(74) *Attorney, Agent, or Firm*—Staas & Halsey LLP

(57) ABSTRACT

An ink composition includes a colorant, a solvent, and an amide compound. Due to the use of the amide compound, the ink composition has effective storage stability and wetness at nozzles and has a low mobility of a colorant due to interaction between the colorant and the amide compound and a high adhesion to paper, thus minimizing bleeding between colors of printed images. In addition, the ink composition has effective color fastness, such as water fastness and dry and wet rubfastness of printed images, on paper, thus providing improved quality and durability of printed images. Further, the ink composition provides improved long-term storage stability. Thus, the ink composition may be used in various applications, such as inks for inkjet printers or printing, coatings, textile printing, making papers, cosmetics, ceramics, and the like.

34 Claims, 2 Drawing Sheets

FOREIGN PATENT DOCUMENTS

| | | |
|---|---|---|
| JP | 61-55172 | 3/1986 |
| JP | 2-191260 | 7/1990 |
| JP | 05-214284 | 8/1993 |
| JP | 2001-152067 | 6/2001 |
| WO | WO2004/029166 * | 4/2004 |

* cited by examiner

INK COMPOSITION

CROSS-REFERENCE TO RELATED APPLICATIONS

This application claims the benefit of Korean Patent Application No. 2004-40901, filed on Jun. 4, 2004, in the Korean Intellectual Property Office, the disclosure of which is incorporated herein in its entirety by reference.

BACKGROUND OF THE INVENTION

1. Field of the Invention

The present invention relates to an ink composition, and more particularly, to an ink composition comprising an amide compound which has a low mobility of a colorant and a high adhesion to paper, thus, minimizing bleeding of colors of printed images.

2. Description of the Related Art

In general, colorants are substances which exhibit inherent colors by selectively absorbing and reflecting visible light. Colorants are classified into dyes and pigments.

Dyes, which are soluble in solvents, are absorbed into any materials to be dyed, such as fibers, leathers, furs, papers, and the like, thus providing considerable fastness to daylight, washing, friction, and the like. Pigments, which are insoluble in solvents, are coloring matters in the form of particulates, and are not absorbed into the material to be dyed, but are adhered to the surface of the material to be dyed by physical connection (e.g., adhesion, and the like.), thus providing their inherent colors.

Since pigments are generally insoluble in the solvents, a uniform dispersion of pigment particulates in a solution is vital to continuously maintain a stable dispersed state.

A water soluble, dye-type ink has effective long-term storage stability, its uniformity is maintained, and its color is clear and brightness is high, while it is weak in water fastness, light resistance, and the like.

A pigment-type ink has a high optical density (OD), and effective water fastness and light resistance, and less bleeding between colors, while its color clearness is poor and its long-term storage stability is weak compared to the dye-type ink. Also, the images printed by the pigment-type inks have weak dry and wet rubfastnesses. When color printing (multicolor printing) with dyes or pigments, bleeding at interfaces of each color occurs, and thus clearness of images is weakened.

To improve rubfastness and color fastness by decreasing mobility of a colorant on a substrate, an ink composition for ink-jets comprising a pigment and a water-soluble resin (U.S. Pat. No. 5,172,133) and an ink composition comprising a specific alcohol as an additive (U.S. Pat. No. 5,529,616) are disclosed.

However, the ink-jet ink is used in jet printing through nozzles, and thus its low viscosity should be maintained. An amount of a polymer binder used in the ink is limited. The binder used in a limited amount cannot bind pigment particles to the substrate sufficiently, thus providing unsatisfactory rubfastness and color fastness.

As another approach to improve rubfastness and color fastness by decreasing mobility of a coloring agent on a substrate, a method including chelating a metal ion (U.S. Pat. No. 4,694,302), a method including reacting a cation with an anion (U.S. Pat. No. 5,623,294), and a method by reaction of a polymer (U.S. Pat. No. 5,629,359) are disclosed.

However, the method including chelating a metal ion has difficulty in obtaining long-term storage stability due to a reaction of each ink constituent with a metal ion contained in ink. The method including reacting a cation with an anion also has ineffective performance due not only to a reaction between ink constituents, but also a reaction of a substrate and ion constituents. Also, the method by reaction of a polymer is environmentally harmful due to an unreacted monomer and needs a curing apparatus and curing time, in addition to the difficulty in obtaining long-term storage stability.

Methods of improving storage stability and wetness of an ink composition before jetting are disclosed (U.S. Pat. Nos. 5,108,503 and 5,981,623). In these methods, various heterocyclic compounds containing nitrogen, such as 2-pyrrolidone, N-methyl-2-pyrrolidone, and 1,3-dimethyl-2-imidazolidinone, are used as additives to improve the performance of the ink composition.

SUMMARY OF THE INVENTION

The present invention provides an ink composition having an effective storage stability and wetness at nozzles, improved bleeding resistance in printing, and improved color fastness, such as rubfastness, water fastness, and the like, thus providing improved quality and durability of printed images and long-term storage stability.

According to an aspect of the present invention, an ink composition includes a colorant, a solvent, and an amide compound represented by formula 1:

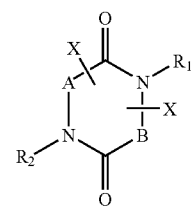

(1)

wherein $R_1$ and $R_2$ are independently a hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, a substituted or unsubstituted $C_3$-$C_{20}$ heteroarylalkenyl group, or a substituted or unsubstituted $C_3$-$C_{20}$ heterocycloalkyl group, A is —CH=CH— or —$C_mH_{2m}$—, B is —CH=CH— or —$C_nH_{2n}$—, m and n are independently an integer of 0 to 8 and 2≦m+n≦8, and X is mono-substituted or poly-substituted, and is hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

According to an aspect of the present invention, an inkjet recording apparatus comprises an ink receiving unit or an ink cartridge containing an ink composition including a colorant, a solvent, and an amide compound in accordance with the ink composition set forth above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
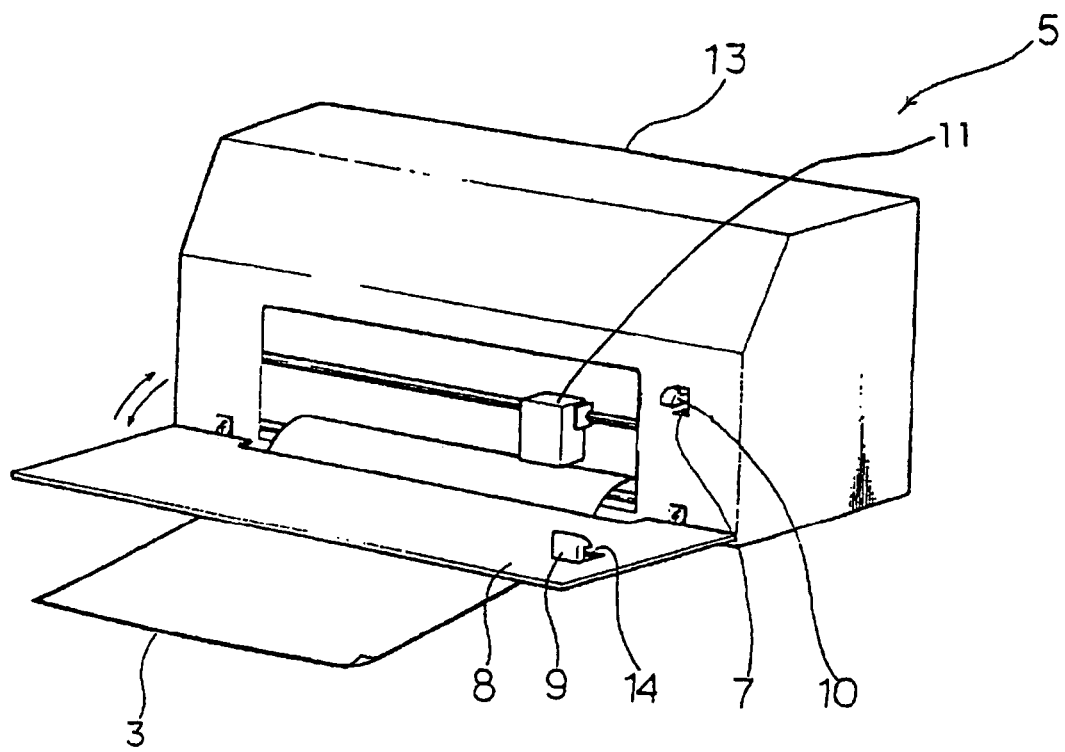
FIG. 1 is a perspective view of an inkjet recording apparatus including an ink receiving unit or an ink cartridge containing an ink composition including a colorant, a solvent, and an amide compound in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the present invention will be described in more detail.

The ink composition according to an embodiment of the present invention includes an amide compound represented by formula 1:

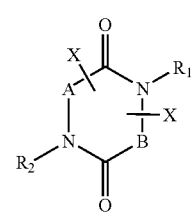

(1)

wherein $R_1$ and $R_2$ are independently hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, a substituted or unsubstituted $C_3$-$C_{20}$ heteroarylalkenyl group, or a substituted or unsubstituted $C_3$-$C_{20}$ heterocycloalkyl group, A is —CH═CH— or —$C_mH_{2m}$—, B is —CH═CH— or —$C_nH_{2n}$—, m and n are independently an integer of 0 to 8 and 2≦m+n≦8, and X is mono-substituted or poly-substituted, and is hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

In formula 1, if m=0, then 2≦n≦8, and if n=0, then 2≦m≦8.

The amide compound represented by formula 1 according to an embodiment of the present invention is a 6 or more-membered cyclic compound. 4- and 5-membered cyclic compounds are unstable due to a ring strain, and steric hindrance of the substituents $R_1$ and $R_2$ makes said cyclic compounds more unstable, while the 6 or more-membered cyclic compound is stable. In addition, cellulose, which is a primary constitutional component of paper, has a 6-membered structure containing —OH groups, and when cellulose forms a hydrogen bond with an amide compound, if a ring structure of cellulose is similar to that of the amide compound, cellulose may form a stronger hydrogen bond with the amide compound in view of the binding angle and the like, and thus, it is advantageous that the amide compound represented by formula 1 is a 6 or more-membered cyclic compound.

In formula 1, $R_1$ and $R_2$ may be hydrogen or a methyl group and A and B may be independently —CH=CH—, —CH$_2$CH$_2$—, —CH$_2$—, or —CH(CH$_3$)—.

In formula 1, if X is poly-substituted, the number of the substituents may be 1 to 8.

Specific examples of the amide compound represented by formula 1 include, but are not limited to, uracil represented by formula 2, 5,6-dihydrouracil represented by formula 3, glycine anhydride represented by formula 4, thymine represented by formula 5, sarcosine anhydride represented by formula 6, and alanine anhydride represented by formula 7.

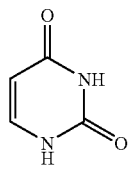

(2)

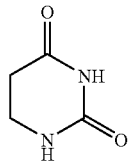

(3)

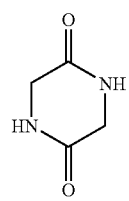

(4)

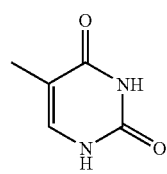

(5)

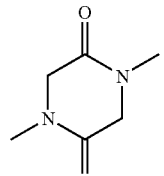

(6)

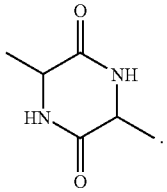

(7)

Hereinafter, the principle by which the amide compound represented by formula 1 exhibits durability (water fastness and rubfastness) and bleeding resistance on paper will be described briefly.

An amide compound, as shown in formula 8 below, may have various resonance structures and high polarity, and thus it is may be charged.

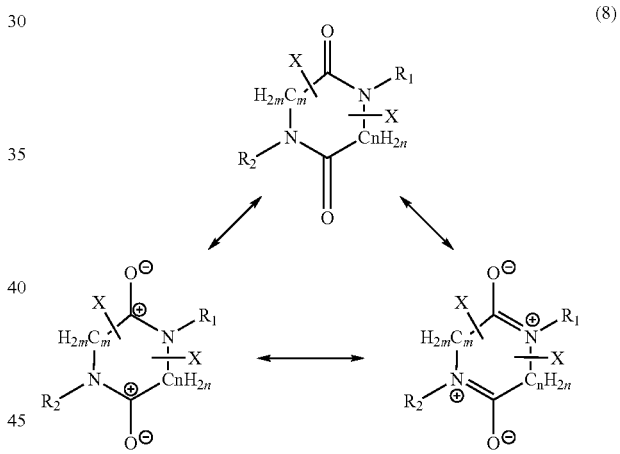

(8)

As seen from formula 8, the amide compound has an anionic character on an oxygen side and a cationic character on a nitrogen side.

If B (see formula 1) represents a chemical bond, two amide bonds are adjacent to each other, and thus a cationic character is delocalized along the nitrogen atoms and carbon atoms of the two amide bonds (see formula 9 below).

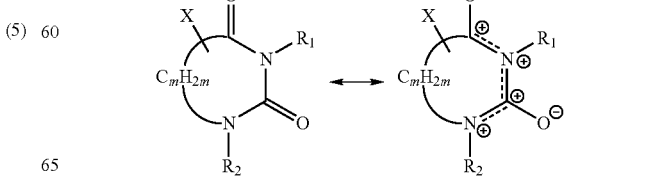

(9)

The cation delocalized in two nitrogen atoms of the amide electrostatically binds to an anion in a pigment and a surface of a sheet of paper, thus decreasing the mobility of a colorant on a surface of a sheet of paper. Thus, durability and bleeding resistance may be improved. Actually, a surface of a pigment is negatively charged to increase the dispersing stability, and a surface of a sheet of paper contains a great number of groups such as —OH and —C═O, and the like, and thus, the anion may electrostatically bond to a cation.

An ink composition comprising such an amide compound may be used in various applications, such as inks for inkjet printers or printing, coatings, textile printing, making papers, cosmetics, ceramics, and the like.

In the ink composition according to an embodiment of the present invention, the content of the amide compound represented by formula 1 is in a range of 0.1 to 30 parts by weight based on 100 parts by weight of the solvent. If the content of the amide compound represented by formula 1 is less than 0.1 parts by weight, the above-mentioned performance of the ink composition is insufficient. If the content of the amide compound represented by formula 1 is more than 30 parts by weight, the ink composition has a reduced solubility in an aqueous solution.

A dye or a pigment may be used as the colorant for the ink composition according to an embodiment of the present invention. The pigment may be a self-dispersible pigment which does not need the use of a dispersing agent. The content of the colorant in the ink composition may be in a range of 0.5 to 10 parts by weight based on 100 parts by weight of the solvent. If the content of the colorant is less than 0.5 parts by weight, color depth is low, and thus, it is difficult to embody colors. If the content of the colorant is more than 10 parts by weight, long-term storage stability, such as prevention of nozzle clogging, is reduced.

An aqueous liquid medium or a mixture of an aqueous liquid medium with an organic solvent may be used as the solvent for the ink composition.

The ink composition according to an embodiment of the present invention may have a surface tension of 15 to 70 dyne/cm at 20° C. and a viscosity of 1.5 to 10 cps. If the surface tension of the ink composition is less than 15 dyne/cm at 20° C., the ink penetrates into the paper too rapidly when printing, and thus it is difficult to embody colors. If the surface tension of the ink composition is more than 70 dyne/cm at 20° C., the ink penetrates into the paper too slowly when printing, and thus a drying time is too lengthy. If the viscosity of the ink composition is less than 1.5 cps, a dot size is too small in ink jetting and a large quantity of the ink penetrates into the paper. If the viscosity of the ink composition is more than 10 cps, the mobility of the ink composition is reduced.

Hereinafter, the ink composition for ink-jetting comprising the amide compound according to an embodiment of the present invention will be described in detail. The following description is for illustrative purpose, and is not intended to limit the scope of the present invention.

An aqueous liquid medium, such as water, may be used alone or in a mixture with an organic solvent as the solvent in the ink composition. The total content of the solvent comprising the ink composition may be in a range of 40 to 95 parts by weight based on 100 parts by weight of the total content of the colorant and the amide compound.

The total content of the organic solvent may be in a range of 2 to 60 parts by weight based on 100 parts by weight of the total solvent. The viscosity and the surface tension of the ink composition may be controlled within a proper range by using a mixture with the organic solvent as the solvent for the ink composition.

The organic solvent may be a hydrocarbon solvent selected from the group consisting of alcohols, such as methyl alcohol, ethyl alcohol, n-propyl alcohol, isopropyl alcohol, n-butyl alcohol, sec-butyl alcohol, t-butyl alcohol, and isobutyl alcohol; polyvalent alcohols, such as ethylene glycol, diethylene glycol, trimethylolpropane glycerol, polyethylene glycol, and polypropylene glycol; ketones, such as acetone, methyl ethyl ketone, and diacetone alcohol; esters, such as ethyl acetate and ethyl lactate; lower alkyl ethers, such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; nitrogen-containing compounds, such as 2-pyrolidone, N-methyl-2-pyrolidone, and caprolactam; and sulfur-containing compounds, such as dimethyl sulfoxide, tetramethylsulfone, and thioglycol.

The ink composition according to an embodiment of the present invention may further include additives, such as a dispersing agent, a viscosity control agent, a surfactant, and a metal oxide, if necessary.

The surfactant controls the surface tension of the ink composition to stabilize a jetting performance at nozzles. The surfactant may include an anionic surfactant and a non-ionic surfactant.

In the ink composition according to an embodiment of the present invention, the content of the surfactant may be in a range of 0.1 to 5.0 parts by weight based on 100 parts by weight of the solvent.

The viscosity control agent controls the viscosity of the ink composition to facilitate effective jetting. The viscosity control agent is selected from the group consisting of polyvinyl alcohol, casein, and carboxymethylcellulose. The content of the viscosity control agent may be in a range of 0.1 to 10 parts by weight based on 100 parts by weight of the solvent.

The ink composition according to an embodiment of the present invention may further include an acid or a base. The acid or the base increases the solubility of a wetting agent in the solvent and stabilizes the colorant. The content of the acid or the base may be in a range of 0.1 to 20 parts by weight based on 100 parts by weight of the solvent.

Examples of the dispersing agent used in the production of the ink composition according to an embodiment of the present invention include sodium salt of naphthalene sulfonic acid-formalin condensation product (DEMOL N, manufactured by KAO CO.). The content of the dispersing agent may be 0.1 to 5 parts by weight based on 100 parts by weight of the solvent.

Production of the ink composition having the above composition will be described as follows.

First, a colorant, an amide compound represented by formula 1, a wetting agent, and the like are added to a solvent, mixed, and then stirred well in a stirrer until the mixture obtained is uniform.

Then, the product was filtered through a filter to obtain an ink composition according to an embodiment of the present invention.

The ink composition comprising the amide compound and a colorant according to an embodiment of the present invention may be used in various applications, such as toner compositions, various coatings, and coating solutions, as well as an ink composition.

Specific examples of an unsubstituted $C_1$-$C_{20}$ alkyl group in formula 1 may include methyl, ethyl, propyl, isopropyl, sec-butyl, pentyl, iso-amyl, and hexyl, and the like. At least one hydrogen atom in the $C_1$-$C_{20}$ alkyl group may be substituted with a halogen atom, a hydroxy group, a nitro group, a cyano group, an amino group, an amidino group, a hydrazine, a hydrazone, a carboxyl group or its salts, a sulfonic acid group or its salts, a phosphoric acid or its salts, or a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The term "heteroalkyl group" refers to an alkyl group, as defined above, which contains nitrogen, sulfur, oxygen, or phosphorus. Examples of the heteroalkyl group include methoxy, ethoxy, propoxy, butoxy, and t-butoxy. Examples of the substituted heteroalkyl group include a haloalkoxy radical, such as fluoromethoxy, chloromethoxy, trifluoromethoxy, trifluoroethoxy, fluoroethoxy, and fluoropropoxy. At least one hydrogen atom in the heteroalkyl group may be substituted with the substituents as described above for alkyl group.

The term "unsubstituted $C_2$-$C_{20}$ alkenyl group" used herein refers to an alkyl group as defined above which contains a carbon double bond in the middle or at the end. Examples of the unsubstituted $C_2$-$C_{20}$ alkenyl group include ethylene, propylene, butylenes, and hexylene. At least one hydrogen atom in the unsubstituted $C_2$-$C_{20}$ alkenyl group may be substituted with the substituents as described above for the alkyl group.

The term "aryl group", employed alone or in combination with other terms, refers to a carbocyclic aromatic system containing 6 to 20 carbon atoms, which may be a single ring or multiple rings which are fused together or linked covalently using a pendant method. Examples of the aryl group include an aromatic radical, such as phenyl, and naphthyl, tetrahydronaphthyl. The aryl group may be substituted with a haloalkylene, a nitro, a cyano, an alkoxy, or a lower alkyamino group. Further, at least one hydrogen atom in the aryl group may be substituted with the substituents as described above for the alkyl group.

The term "arylalkyl group" refers to an aryl group, as defined above, in which some hydrogen is substituted with a lower alkyl radical, such as methyl, ethyl, or propyl, or the like. Examples of the arylalkyl group include benzyl and phenylethyl, and the like. At least one hydrogen atom in the arylalkyl group may be substituted with the substituents as described above for the alkyl group.

The term "heteroaryl group" refers to a monovalent or bivalent, monocyclic or bicyclic aromatic organic compound containing 1 to 20 carbon atoms, which contains 1 to 3 hetero atoms selected from the group consisting of N, O, P, and S in a ring. At least one hydrogen atom in the heteroaryl group may be substituted with the substituents as described above for alkyl group.

The term "heteroarylalkyl group" refers to an heteroaryl group as defined above in which some of hydrogen is substituted with an alkyl radical. At least one hydrogen atom in the heteroarylalkyl group may be substituted with the substituents as described above for alkyl group.

The present invention will be described in more detail by presenting the following examples. These examples are for illustrative purposes only, and are not intended to limit the scope of the present invention. The following tests were used to evaluate the characteristics of ink. The tests may also be applied to wet-type toners, dry-type toners, coatings and/or coating solutions. An ink composition will be described as a representative embodiment of the composition comprising an amide compound and a colorant. However, this is not meant to limit the scope of the present invention.

EXAMPLES

Example 1

4.0 g of carbon black (CABOT-300, manufactured by CABOT CO.) (a self-dispersible pigment), 6.0 g of uracil represented by formula 2, 66.0 g of water, 8.0 g of diethylene glycol, 8.0 g of trimethylolpropane, and 8.0 g of glycerine were mixed and stirred for at least 30 minutes in a stirrer until a uniform mixture was obtained.

Then, the resultant product was passed through a 0.45 μm filter to produce an ink composition.

Example 2

An ink composition was produced in the same manner as in Example 1, except that carbon black (REGAL 330, manufactured by CABOT CO.) was used instead of carbon black (CABOT-300, manufactured by CABOT CO.) and 5,6-dihydrouracil represented by formula 3 was used instead of uracil represented by formula 2.

Example 3

4.0 g of a dye (C.I. DIRECT BLACK 154), 6.0 g of glycine anhydride represented by formula 4, 66.0 g of water, 8.0 g of PEG 200 (manufactured by KANTO CHEMICAL), 7.0 g of trimethylolpropane, and 9.0 g of glycerine were mixed and stirred for at least 30 minutes in a stirrer until a uniform mixture was obtained. Then, the resultant product was passed through a 0.45 μm filter to produce an ink composition.

Example 4

An ink composition was produced in the same manner as in Example 3, except that thymine represented by formula 5 was used as an amide compound and C.I. ACID BLACK 7 was used as a dye.

Example 5

4.0 g of carbon black (RAVEN 5250, manufactured by COLUMBIAN CO.), 6.0 g of sarcosine anhydride represented by formula 6, 64.0 g of water, 2.0 g of a dispersing agent (DEMOL N, sodium salt of naphthalene sulfonic acid-formalin condensation product, manufactured by KAO CO.), 7.0 g of PEG 400 (manufactured by KANTO CHEMICAL), 8.0 g of 1,5-pentanediol, and 9.0 g of glycerine were mixed and stirred for at least 30 minutes in a stirrer until a uniform mixture was obtained. Then, the resultant product was passed through a 0.45 μm filter to produce an ink composition.

Example 6

An ink composition was produced in the same manner as in Example 5, except that alanine anhydride represented by formula 7 was used as an amide compound and carbon black (No. 258, manufactured by MITSUBISHI CO.) was used as a pigment.

Comparative Examples 1 to 6

Ink compositions were respectively produced in the same composition and the same manner as in Examples 1 to 6, except that an amide compound was not used.

The properties of the ink compositions obtained from Examples 1 to 6 and Comparative Examples 1 to 6 were estimated according to the following methods.

1) Long-term Storage Stability 100 ml of the ink compositions obtained from Examples 1 to 6 and Comparative examples 1 to 6 were respectively placed in heat resistant glass bottles, hermetically sealed, and then stored at 60° C. in an incubator. The bottles were left for 2 months, and then it was confirmed whether precipitates formed at the bottoms of the bottles and estimated as follows. The results are shown in Table 1.

TABLE 1

|  | Example | | | | | |
| --- | --- | --- | --- | --- | --- | --- |
| No. | 1 | 2 | 3 | 4 | 5 | 6 |
| Estimation | ○ | ○ | ○ | ○ | ○ | ○ |

|  | Comparative Example | | | | | |
| --- | --- | --- | --- | --- | --- | --- |
| No. | 1 | 2 | 3 | 4 | 5 | 6 |
| Estimation | ○ | X | X | X | ○ | X |

○: No precipitate
X: Precipitated

Referring to Table 1, while there were no precipitates in the ink compositions obtained from Examples 1 to 6, precipitates formed in the ink compositions obtained from Comparative Examples 2, 3 and 6. From the results, it was confirmed that the ink compositions obtained from Examples 1 to 6 were more stable regarding storage compared to the ink compositions obtained from Comparative Examples 2, 3 and 6.

2) Test of Nozzle Clogging

The ink compositions obtained from Examples 1 to 6 and Comparative Examples 1 to 6 were respectively charged into a SAMSUNG Ink cartridge and placed at room temperature (25° C.) and a low temperature (−18° C.) for two weeks. Then, the degree of nozzle clogging was evaluated based on an amount of ink printed out from the cartridge when printing, as follows. The results are shown in Table 2.

TABLE 2

|  | Example | | | | | |
| --- | --- | --- | --- | --- | --- | --- |
| No. | 1 | 2 | 3 | 4 | 5 | 6 |
| Estimation (Room temp.) | ○ | ○ | ○ | ○ | ○ | ○ |
| Estimation (Low temp.) | ○ | ○ | ○ | ○ | ○ | ○ |

|  | Comparative Example | | | | | |
| --- | --- | --- | --- | --- | --- | --- |
| No. | 1 | 2 | 3 | 4 | 5 | 6 |
| Estimation (Room temp.) | Δ | X | ○ | Δ | ○ | ○ |
| Estimation (Low temp.) | ○ | X | ○ | X | X | ○ |

○: Nozzle clogging is not observed.
Δ: Nozzle clogging at 1 to 2 nozzles.
X: Nozzle clogging at 3 or more nozzles.

Referring to Table 2, while no nozzle clogging was observed in any nozzles for the ink compositions obtained from Examples 1 to 6 and Comparative Examples 3 and 6, nozzle clogging was observed for Comparative Examples 1, 2, 4 and 5.

3) Test of Rubfastness

The ink compositions obtained from Examples 1 to 6 and Comparative Examples 1 to 6 were respectively refilled into INK CARTRIDGE M-50 (manufactured by SAMSUNG) and bar pictures (2*10 cm) were printed using a printer (MJC-2400C, manufactured by SAMSUNG). The bar pictures were dried for 24 hours and then rubbed 5 times with a tester to obtain the transferred images. An OD value of a transferred bar image was expressed as a percentage relative to an OD value of the bar image before rubbing and estimated as follows. The results are shown in Table 3.

TABLE 3

|  | Example | | | | | |
| --- | --- | --- | --- | --- | --- | --- |
| No. | 1 | 2 | 3 | 4 | 5 | 6 |
| Estimation | ○ | ○ | ○ | ○ | ○ | Δ |

|  | Comparative Example | | | | | |
| --- | --- | --- | --- | --- | --- | --- |
| No. | 1 | 2 | 3 | 4 | 5 | 6 |
| Estimation | X | X | Δ | Δ | X | X |

A = (OD of transferred bar image/OD of the original bar image) × 100 (%)
○: A < 20
Δ: 20 ≦ A < 30
X: A > 30

It was confirmed from Table 3 that the ink compositions obtained from Examples 1 to 6 had better rubfastness than the ink compositions obtained from Comparative Examples 1 to 6.

4) Test of Water Fastness

The ink compositions obtained from Examples 1 to 6 and Comparative Examples 1 to 6 were respectively refilled into INK CARTRIDGE M-50 (manufactured by SAMSUNG) and bar pictures (2*10 cm) were printed using a printer (MJC-2400C, manufactured by SAMSUNG). After 5 minutes, 5 drops of water were added to the bar pictures and the drops flowed down. Then the bar pictures were dried for 24 hours. An OD value of a water-flowed bar image was expressed as a percentage relative to an OD value of the original bar image and estimated as follows. The results are shown in Table 4.

TABLE 4

|  | Example | | | | | |
| --- | --- | --- | --- | --- | --- | --- |
| No. | 1 | 2 | 3 | 4 | 5 | 6 |
| Estimation | ○ | ○ | Δ | Δ | ○ | ○ |

|  | Comparative Example | | | | | |
| --- | --- | --- | --- | --- | --- | --- |
| No. | 1 | 2 | 3 | 4 | 5 | 6 |
| Estimation | X | Δ | X | X | X | Δ |

A = (OD of water-flowed bar image/OD of the original image) × 100 (%)
○: A > 95
Δ: 90 ≦ A < 95
X: A < 90

It was confirmed from Table 4 that the ink compositions obtained from Examples 1 to 6 had more effective water fastness compared to the ink compositions obtained from Comparative Examples 1 to 6.

5) Test of Bleeding Resistance

The ink compositions obtained from Examples 1 to 6 and Comparative Examples 1 to 6 were respectively refilled into INK CARTRIDGE M-50 (manufactured by SAMSUNG) and test patterns were printed together with color ink C-60 (manufactured by SAMSUNG) using a printer (MJC-2400C, manufactured by SAMSUNG). After 30 minutes, positions of dot lines in which color mixing occurred based on interfaces between adjacent two colors were determined using a microscope (with respect to estimation standards, see U.S. Pat. No. 5,854,307).

Degrees of bleeding were estimated as follows.

TABLE 5

| No. | Example | | | | | |
|---|---|---|---|---|---|---|
|  | 1 | 2 | 3 | 4 | 5 | 6 |
| Estimation | 5 | 4 | 5 | 5 | 5 | 4 |
| No. | Comparative Example | | | | | |
|  | 1 | 2 | 3 | 4 | 5 | 6 |
| Estimation | 3 | 2 | 2 | 3 | 3 | 2 |

5: No color mixing occurred on the interface.
4: Color mixing occurred in a width corresponding to a diameter of 1 dot.
3: Color mixing occurred in a width corresponding to diameters of 2 dots.
2: Color mixing occurred in a width corresponding to diameters of 3 dots.
1: Color mixing occurred in a width corresponding to diameters of 4 dots or more (based on 600 dpi, a diameter of 1 dot = 100 μm).

It was confirmed from Table 5 that the ink compositions obtained from Examples 1 to 6 had superior bleeding resistance compared to the ink compositions obtained from Comparative Examples 1 to 6.

The ink composition including an amide compound represented by formula 1 according to an embodiment of the present invention has an improved storage stability and wetness at nozzles and has a low mobility of a colorant and an improved adhesion to a sheet of paper, thus minimizing bleeding between colors of printed images. In addition, the ink composition has improved color fastness, such as water fastness and dry and wet rubfastness of printed images, on a paper, thus providing improved quality and durability of printed images. Further, the ink composition provides improved quality of printed images and long-term storage stability. Thus, the ink composition may be used in various applications, such as inks for inkjet printers or printing, coatings, textile printing, making papers, cosmetics, ceramics, and the like.

As illustrated in FIG. 1, in an embodiment, an inkjet recording apparatus includes an ink receiving unit or an ink cartridge containing the ink composition including a colorant, a solvent, and an amide compound represented by formula 1, as further described above. A printer cover 8 is hingedly connected to a main body 13 of a printer 5. An interlocking portion of a moveable latch 10 protrudes through a hole 7. The moveable latch 10 interlocks with a fixed latch 9, which is attached to the inside of the printer cover when the cover is closed. The cover has a recess 14 corresponding to the interlocking portion of the moveable latch 10 that extends through hole 7. An ink cartridge 11 is mounted to place ink on paper 3 passing below the ink cartridge 11.

Figure 2:
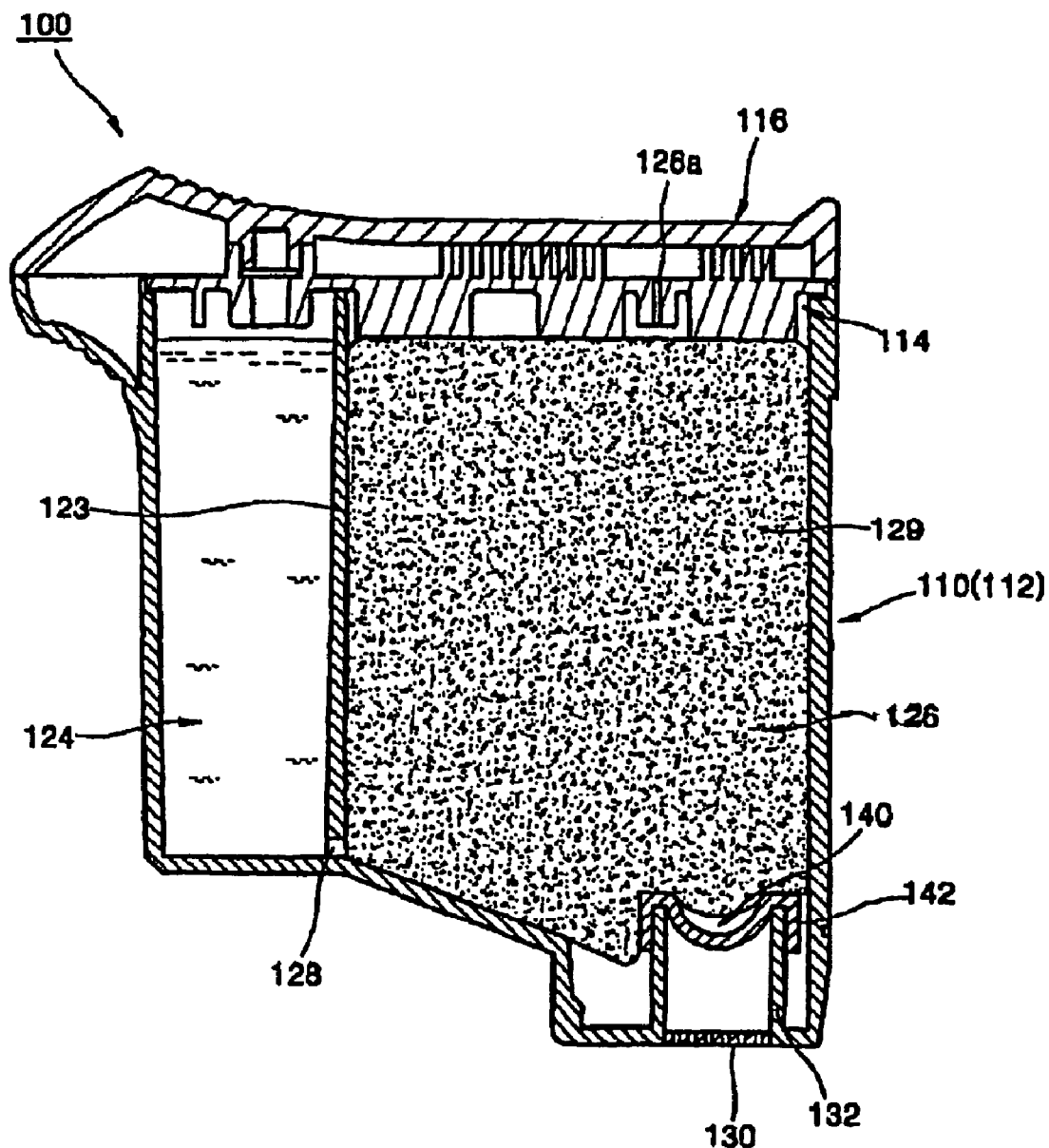
FIG. 2 is a cross-sectional side view of an ink receiving unit or an ink cartridge containing an ink composition including a colorant, a solvent, and an amide compound in accordance with an embodiment of the present invention.

FIG. 2 is a cross-sectional side view of an ink receiving unit or an ink cartridge containing an ink composition comprising a colorant, a solvent, and an amide compound in accordance with an embodiment of the present invention. The ink cartridge 100 includes a cartridge body 110 forming an ink reservoir 112, an internal cover 114 covering a top portion of the ink reservoir 112, an external cover 116, which is spaced apart from the internal cover 114 by a predetermined gap, to seal the ink reservoir 112 and the internal cover 114.

The ink reservoir 112 is divided into first and second chambers 124 and 126 by a vertical barrier wall 123. An ink passage 128 between the first and second chambers 124 and 126 is formed on a bottom of the vertical barrier wall 123. Ink fills the first chamber 124, and a sponge 129 and ink fill the second chamber 126. A vent hole 126a which corresponds to the second chamber 126, is formed on the internal cover 114.

A filter 140 is provided under the second chamber 126 to prevent an ejection hole of a printhead 130 from being clogged by filtering impurities and fine bubbles in the ink. A hook 142 is formed on an edge (a rim portion) of the filter 140 to be disposed on (coupled to) a top portion of a standpipe 132. Through the ejection hole of the printhead 130, the ink from the ink reservoir 112 is ejected onto a printing medium in a droplet shape.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An ink composition comprising a colorant, a solvent, and an amide compound represented by formula 1:

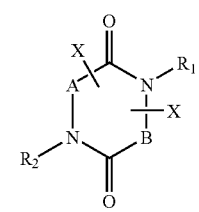

(1)

wherein

R$_1$ and R$_2$ are independently hydrogen, an unsubstituted C$_1$-C$_{20}$ alkyl group, a substituted or unsubstituted C$_1$-C$_{20}$ heteroalkyl group, a substituted or unsubstituted C$_2$-C$_{20}$ alkenyl group, a substituted or unsubstituted C$_1$-C$_{20}$ alkoxy group, a substituted or unsubstituted C$_1$-C$_{20}$ alkylsulfoneamide group, a substituted or unsubstituted C$_6$-C$_{20}$ arylsulfoneamide group, a substituted or unsubstituted C$_1$-C$_{20}$ acylamino group, a C$_1$-C$_{20}$ alkylureido group, a C$_6$-C$_{20}$ arylureido group, a C$_2$-C$_{20}$ alkoxycarbonyl group, a C$_2$-C$_{20}$ alkoxycarbonylamino group, a carbamoyl group, a sulfamoyl group, a sulfo group and its salts, a carboxyl group and its salts, a substituted or unsubstituted C$_1$-C$_{20}$ hydroxyalkyloxyalkyl group, a substituted or unsubstituted C$_1$-C$_{20}$ dialkylaminoalkyl group, a substituted or unsubstituted C$_6$-C$_{20}$ pyridylalkyl group, a substituted or unsubstituted C$_5$-C$_{20}$ pyridyl group, a substituted or unsubstituted C$_6$-C$_{20}$ imidazolyl group, a hydrazine group, a hydrazone group, a substituted or unsubstituted C$_1$-C$_{20}$ pyridylalkyl group, a substituted or unsubstituted C$_6$-C$_{20}$ aryl group, a substituted or unsubstituted C$_6$-C$_{20}$ arylalkyl group, a substituted or unsubstituted C$_6$-C$_{20}$ heteroaryl group, a substituted or unsubstituted C$_6$-C$_{20}$ heteroarylalkyl group, a substituted or unsubstituted C$_6$-C$_{20}$ heteroarylalkenyl group, a substituted or unsubstituted C$_3$-C$_{20}$ heteroarylalkenyl group, or a substituted or unsubstituted C$_3$-C$_{20}$ heterocycloalkyl group, A is —CH═CH— or —C$_m$H$_{2m}$—, B is —CH═CH— or —C$_n$H$_{2n}$—, m and n are independently an integer of 1, and X is mono-substituted or poly-substituted, and is hydrogen, a substituted or unsubstituted C$_1$-C$_{20}$ alkyl group, a substituted or unsubstituted C$_1$-C$_{20}$ heteroalkyl group, a substituted or unsubstituted C$_2$-C$_{20}$ alkenyl group, a substituted or unsubstituted C$_1$-C$_{20}$ alkoxy group, a substituted or unsubstituted C$_1$-C$_{20}$ alkylsulfoneamide group, a substituted or unsubstituted C$_6$-C$_{20}$ arylsulfoneamide group, a substituted or unsubstituted C$_1$-C$_{20}$ acylamino group, a C$_1$-C$_{20}$ alkylureido group, a C$_6$-C$_{20}$ arylureido group, a C$_2$-C$_{20}$ alkoxycarbonyl group, a C$_2$-C$_{20}$ alkoxycarbonylamino group, a carbamoyl group, a sulfamoyl group, a sulfo group and its salts, a carboxyl group and its salts, a substituted or unsubstituted C$_1$-C$_{20}$ hydroxyalkyloxyalkyl group, a substituted or unsubstituted C$_1$-C$_{20}$ dialkylaminoalkyl group, a substituted or unsubstituted C$_6$-C$_{20}$ pyridylalkyl group, a substituted or unsubstituted C$_5$-C$_{20}$ pyridyl group, a substituted or unsubstituted C$_6$-C$_{20}$ imidazolyl group, a hydrazine group, a hydrazone group, a substituted or unsubstituted C$_1$-C$_{20}$ pyridylalkyl group, a substituted or unsubstituted C$_6$-C$_{20}$ aryl group, a substituted or unsubstituted C$_6$-C$_{20}$ arylalkyl group, a substituted or unsubstituted C$_6$-C$_{20}$ heteroaryl group, a C$_6$-C$_{20}$ heteroarylalkyl group, a substituted or unsubstituted C$_6$-C$_{20}$ heteroarylalkenyl group, or a substituted or unsubstituted C$_3$-C$_{20}$ heterocycloalkyl group.

2. The ink composition of claim 1, wherein each of R$_1$ and R$_2$ is a hydrogen or a methyl group and A and B are independently —CH═CH—, —CH$_2$CH$_2$—, —CH$_2$—, or —CH(CH$_3$)—.

3. The ink composition of claim 1, wherein the amide compound represented by formula 1 is one of those represented by formulas 2 through 4:

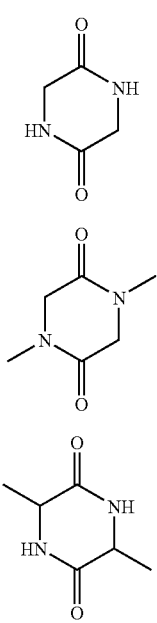

(2)

(3)

(4)

4. The ink composition of claim 1, wherein the content of the amide compound represented by formula 1 is in a range of 0.1 to 30 parts by weight based on 100 parts by weight of the solvent.

5. The ink composition of claim 1, wherein the colorant is a dye or a pigment.

6. The ink composition of claim 1, wherein the content of the colorant is in a range of 0.5 to 10 parts by weight based on 100 parts by weight of the solvent.

7. The ink composition of claim 1, wherein the solvent is an aqueous liquid medium or a mixture of an aqueous liquid medium with an organic solvent.

8. The ink composition of claim 1, which has a surface tension of 15 to 70 dyne/cm at 20° C. and a viscosity of 1.5 to 10 cps.

9. The ink composition of claim 1, wherein a total content of the solvent is in a range of 40 to 95 parts by weight based on 100 parts by weight of a total content of the colorant and the amide compound.

10. The ink composition of claim 1, wherein the solvent includes an aqueous liquid medium and an organic solvent, and a total content of the organic solvent is in a range of 2 to 60 parts by weight based on 100 parts by weight of total solvent.

11. The ink composition of claim 10, wherein the organic solvent is selected from the group consisting of primary alcohols, secondary alcohols, tertiary alcohols, polyvalent alcohols, ketones, esters, lower alkyl ethers, nitrogen-containing compounds, and sulfur-containing compounds.

12. The ink composition of claim 11, wherein the organic solvent is selected from the group consisting of methyl alcohol, ethyl alcohol, n-propyl alcohol, isopropyl alcohol, n-butyl alcohol, sec-butyl alcohol, t-butyl alcohol, isobutyl alcohol, ethylene glycol, diethylene glycol, trimethylolpropane glycerol, polyethylene glycol, polypropylene glycol, acetone, methyl ethyl ketone, diacetone alcohol, ethyl acetate and ethyl lactate, ethylene glycol monomethyl ether, ethylene glycol monoethyl ether, diethylene glycol methyl ether, diethylene glycol ethyl ether, triethylene glycol monomethyl ether, triethylene glycol monoethyl ether, 2-pyrolidone, N-methyl-2-pyrolidone, caprolactam, dimethyl sulfoxide, tetramethylsulfone, and thioglycol.

13. The ink composition of claim 1, further including at least one of a dispersing agent, a viscosity control agent, a surfactant, or a metal oxide.

14. An inkjet recording apparatus comprising an ink receiving unit or an ink cartridge containing the ink composition comprising a colorant, a solvent, and an amide compound represented by formula 1:

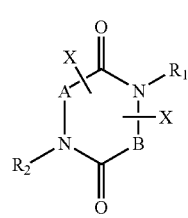

(1)

wherein

R$_1$ and R$_2$ are independently hydrogen, an unsubstituted C$_1$-C$_{20}$ alkyl group, a substituted or unsubstituted C$_1$-C$_{20}$ heteroalkyl group, a substituted or unsubstituted C₂-C₂₀ alkenyl group, a substituted or unsubstituted C₁-C₂₀ alkoxy group, a substituted or unsubstituted C₁-C₂₀ alkylsulfoneamide group, a substituted or unsubstituted C₆-C₂₀ arylsulfoneamide group, a substituted or unsubstituted C₁-C₂₀ acylamino group, a C₁-C₂₀ alkylureido group, a C₆-C₂₀ arylureido group, a C₂-C₂₀ alkoxycarbonyl group, a C₂-C₂₀ alkoxycarbonylamino group, a carbamoyl group, a sulfamoyl group, a sulfo group and its salts, a carboxyl group and its salts, a substituted or unsubstituted C₁-C₂₀ hydroxyalkyloxyalkyl group, a substituted or unsubstituted C₁-C₂₀ dialkylaminoalkyl group, a substituted or unsubstituted C₆-C₂₀ pyridylalkyl group, a substituted or unsubstituted C₅-C₂₀ pyridyl group, a substituted or unsubstituted C₆-C₂₀ imidazolyl group, a hydrazine group, a hydrazone group, a substituted or unsubstituted C₁-C₂₀ pyridylalkyl group, a substituted or unsubstituted C₆-C₂₀ aryl group, a substituted or unsubstituted C₆-C₂₀ arylalkyl group, a substituted or unsubstituted C₆-C₂₀ heteroaryl group, a substituted or unsubstituted C₆-C₂₀ heteroarylalkyl group, a substituted or unsubstituted C₆-C₂₀ heteroarylalkenyl group, a substituted or unsubstituted C₃-C₂₀ heteroarylalkenyl group, or a substituted or unsubstituted C₃-C₂₀ heterocycloalkyl group, A is —CH=CH— or —C$_m$H$_{2m}$—,
B is —CH=CH— or —C$_n$H$_{2n}$—,
m and n are independently an integer of 1, and
X is mono-substituted or poly-substituted, and is hydrogen, a substituted or unsubstituted C₁-C₂₀ alkyl group, a substituted or unsubstituted C₁-C₂₀ heteroalkyl group, a substituted or unsubstituted C₂-C₂₀ alkenyl group, a substituted or unsubstituted C₁-C₂₀ alkoxy group, a substituted or unsubstituted C₁-C₂₀ alkylsulfoneamide group, a substituted or unsubstituted C₆-C₂₀ arylsulfoneamide group, a substituted or unsubstituted C₁-C₂₀ acylamino group, a C₁-C₂₀ alkylureido group, a C₆-C₂₀ arylureido group, a C₂-C₂₀ alkoxycarbonyl group, a C₂-C₂₀ alkoxycarbonylamino group, a carbamoyl group, a sulfamoyl group, a sulfo group and its salts, a carboxyl group and its salts, a substituted or unsubstituted C₁-C₂₀ hydroxyalkyloxyalkyl group, a substituted or unsubstituted C₁-C₂₀ dialkylaminoalkyl group, a substituted or unsubstituted C₆-C₂₀ pyridylalkyl group, a substituted or unsubstituted C₅-C₂₀ pyridyl group, a substituted or unsubstituted C₆-C₂₀ imidazolyl group, a hydrazine group, a hydrazone group, a substituted or unsubstituted C₁-C₂₀ pyridylalkyl group, a substituted or unsubstituted C₆-C₂₀ aryl group, a substituted or unsubstituted C₆-C₂₀ arylalkyl group, a substituted or unsubstituted C₆-C₂₀ heteroaryl group, a C₆-C₂₀ heteroarylalkyl group, a substituted or unsubstituted C₆-C₂₀ heteroarylalkenyl group, or a substituted or unsubstituted C₃-C₂₀ heterocycloalkyl group.

15. The inkjet recording apparatus of claim 14, wherein each of R₁ and R₂ is a hydrogen or a methyl group and A and B are independently —CH=CH—, —CH₂CH₂—, —CH₂—, or —CH(CH₃)—.

16. The inkjet recording apparatus of claim 14, wherein the amide compound represented by formula 1 is one of those represented by formulas 2 through 4:

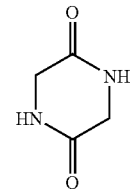

(2)

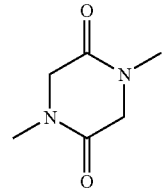

(3)

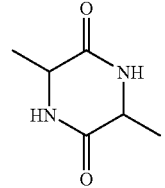

(4)

17. The inkjet recording apparatus of claim 14, wherein the content of the amide compound represented by formula us in a range of 0.1 to 30 parts by weight based on 100 parts by weight of the solvent.

18. The inkjet recording apparatus of claim 14, wherein the colorant is a dye or a pigment.

19. The inkjet recording apparatus of claim 14, wherein the content of the colorant is in a range of 0.5 to 10 parts by weight based on 100 parts by weight of the solvent.

20. The inkjet recording apparatus of claim 14, wherein the solvent is an aqueous liquid medium or a mixture of an aqueous liquid medium with an organic solvent.

21. The inkjet recording apparatus of claim 14, wherein the ink composition has a surface tension of 15 to 70 dyne/cm at 20° C. and a viscosity of 1.5 to 10 cps.

22. The inkjet recording apparatus of claim 14, further including at least one of a dispersing agent, a viscosity control agent, a surfactant, or a metal oxide.

23. An ink receiving unit/ink cartridge containing the ink composition comprising a colorant, a solvent, and an amide compound represented by formula 1:

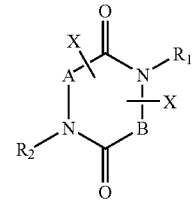

(1)

wherein

R₁ and R₂ are independently hydrogen, an unsubstituted C₁-C₂₀ alkyl group, a substituted or unsubstituted C₁-C₂₀ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, a substituted or unsubstituted $C_3$-$C_{20}$ heteroarylalkenyl group, or a substituted or unsubstituted $C_3$-$C_{20}$ heterocycloalkyl group, A is —CH=CH— or —$C_mH_{2m}$—, B is —CH=CH— or —$C_nH_{2n}$—, m and n are independently an integer of 1, and X is mono-substituted or poly-substituted, and is hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C20$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

24. The ink receiving unit/ink cartridge of claim 23, wherein each of $R_1$ and $R_2$ is a hydrogen or a methyl group and A and B are independently —CH=CH—, —$CH_2CH_2$—, —$CH_2$—, or —$CH(CH_3)$—.

25. The ink receiving unit/ink cartridge of claim 23, wherein the amide compound represented by formula 1 is one of those represented by formulas 2 through 4:

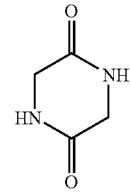

(2)

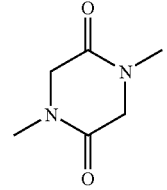

(3)

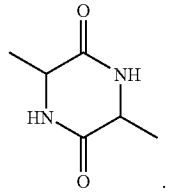

(4)

26. The ink receiving unit/ink cartridge of claim 23, wherein the content of the amide compound represented by formula 1 is in a range of 0.1 to 30 parts by weight based on 100 parts by weight of the solvent.

27. The ink receiving unit/ink cartridge of claim 23, wherein the colorant is a dye or a pigment.

28. The ink receiving unit/ink cartridge of claim 23, wherein the content of the colorant is in a range of 0.5 to 10 parts by weight based on 100 parts by weight of the solvent.

29. The ink receiving unit/ink cartridge of claim 23, wherein the solvent is an aqueous liquid medium or a mixture of an aqueous liquid medium with an organic solvent.

30. The ink receiving unit/ink cartridge of claim 23, wherein the ink composition has a surface tension of 15 to 70 dyne/cm at 20° C. and a viscosity of 1.5 to 10 cps.

31. The ink receiving unit/ink cartridge of claim 23, further including at least one of a dispersing agent, a viscosity control agent, a surfactant, or a metal oxide.

32. An ink composition comprising a colorant, a solvent, and an amide compound represented by formula 1:

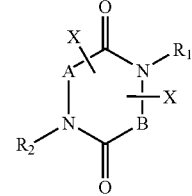

(1)

wherein $R_1$ and $R_2$ are independently hydrogen, an unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_6$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, a substituted or unsubstituted $C_3$-$C_{20}$ heteroarylalkenyl group, or a substituted or unsubstituted $C_3$-$C_{20}$ heterocycloalkyl group, A is —CH=CH— or —$C_mH_{2m}$—, B is —CH=CH— or —$C_nH_{2n}$—, m and n are independently an integer of 1 and X is mono-substituted or poly-substituted, and is hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_l$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group, or a substituted or unsubstituted $C_3C_{20}$ heterocycloalkyl group, wherein each of $R_1$ and $R_2$ is a hydrogen or a methyl group and A and B are independently —CH=CH—, —$CH_2CH_2$—, —$CH_2$—, or —$CH(CH_3)$—.

33. An inkjet recording apparatus comprising an ink receiving unit or an ink cartridge containing the ink composition comprising a colorant, a solvent, and an amide compound represented by formula 1:

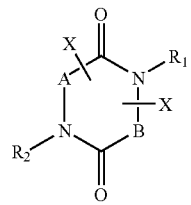

(1)

wherein $R_1$ and $R_2$ are independently hydrogen, an unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group, A is —CH=CH— or —$C_mH_{2m}$—, B is —CH=CH— or —$C_nH_{2n}$—, m and n are independently an integer of 1, and X is mono-substituted or poly-substituted, and is hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and its salts, a carboxyl group and its salts, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group, wherein each of $R_1$ and $R_2$ is a hydrogen or a methyl group and A and B are independently —CH=CH—, —$CH_2CH_2$—, —$CH_2$—, or —$CH(CH_3)$—.

34. An ink receiving unit/ink cartridge containing the ink composition comprising a colorant, a solvent, and an amide compound represented by formula 1:

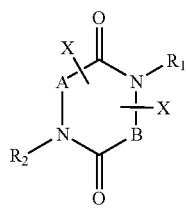

(1)

wherein

R$_1$ and R$_2$ are independently hydrogen, an unsubstituted C$_1$-C$_{20}$ alkyl group, a substituted or unsubstituted C$_1$-C$_{20}$ heteroalkyl group, a substituted or unsubstituted C$_2$-C$_{20}$ alkenyl group, a substituted or unsubstituted C$_1$-C$_{20}$ alkoxy group, a substituted or unsubstituted C$_1$-C$_{20}$ alkylsulfoneamide group, a substituted or unsubstituted C$_6$-C$_{20}$ arylsulfoneamide group, a substituted or unsubstituted C$_1$-C$_{20}$ acylamino group, a C$_1$-C$_{20}$ alkylureido group, a C$_6$-C$_{20}$ arylureido group, a C$_2$-C$_{20}$ alkoxycarbonyl group, a C$_2$-C$_{20}$ alkoxycarbonylamino group, a carbamoyl group, a sulfamoyl group, a sulfo group and its salts, a carboxyl group and its salts, a substituted or unsubstituted C$_1$-C$_{20}$ hydroxyalkyloxyalkyl group, a substituted or unsubstituted C$_1$-C$_{20}$ dialkylaminoalkyl group, a substituted or unsubstituted C$_6$-C$_{20}$ pyridylalkyl group, a substituted or unsubstituted C$_5$-C$_{20}$ pyridyl group, a substituted or unsubstituted C$_6$-C$_{20}$ imidazolyl group, a hydrazine group, a hydrazone group, a substituted or unsubstituted C$_1$-C$_{20}$ pyridylalkyl group, a substituted or unsubstituted C$_6$-C$_{20}$ aryl group, a substituted or unsubstituted C$_6$-C$_{20}$ arylalkyl group, a substituted or unsubstituted C$_6$-C$_{20}$ heteroaryl group, a substituted or unsubstituted C$_6$-C$_{20}$ heteroarylalkyl group, a substituted or unsubstituted C$_6$-C$_{20}$ heteroarylalkenyl group, a substituted or unsubstituted C$_3$-C$_{20}$ heteroarylalkenyl group, or a substituted or unsubstituted C$_3$-C$_{20}$ heterocycloalkyl group, A is —CH=CH— or —C$_m$H$_{2m}$—, B is —CH=CH— or —C$_n$H$_{2n}$—, m and n are independently an integer of 1, and X is mono-substituted or poly-substituted, and is hydrogen, a substituted or unsubstituted C$_1$-C$_{20}$ alkyl group, a substituted or unsubstituted C$_1$-C$_{20}$ heteroalkyl group, a substituted or unsubstituted C$_2$-C$_{20}$ alkenyl group, a substituted or unsubstituted -C$_1$C$_{20}$ alkoxy group, a substituted or unsubstituted C$_1$-C$_{20}$ alkylsulfoneamide group, a substituted or unsubstituted C$_6$-C$_{20}$ arylsulfoneamide group, a substituted or unsubstituted C$_1$-C$_{20}$ acylamino group, a C$_1$-C$_{20}$ alkylureido group, a C$_6$-C$_{20}$ arylureido group, a C$_2$-C$_{20}$ alkoxycarbonyl group, a C$_2$-C$_{20}$ alkoxycarbonylamino group, a carbamoyl group, a sulfamoyl group, a sulfo group and its salts, a carboxyl group and its salts, a substituted or unsubstituted C$_1$-C$_{20}$ hydroxyalkyloxyalkyl group, a substituted or unsubstituted C$_1$-C$_{20}$ dialkylaminoalkyl group, a substituted or unsubstituted C$_6$-C$_{20}$ pyridylalkyl group, a substituted or unsubstituted C$_5$-C$_{20}$ pyridyl group, a substituted or unsubstituted C$_6$-C$_{20}$ imidazolyl group, a hydrazine group, a hydrazone group, a substituted or unsubstituted C$_1$-C$_{20}$ pyridylalkyl group, a substituted or unsubstituted C$_6$-C$_{20}$ aryl group, a substituted or unsubstituted C$_6$-C$_{20}$ arylalkyl group, a substituted or unsubstituted C$_6$-C$_{20}$ heteroaryl group, a C$_6$-C$_{20}$ heteroarylalkyl group, a substituted or unsubstituted C$_6$-C$_{20}$ heteroarylalkenyl group, or a substituted or unsubstituted C$_3$-C$_{20}$ heterocycloalkyl group, wherein each of R$_1$ and R$_2$ is a hydrogen or a methyl group and A and B are independently —CH=CH—, —CH$_2$CH$_2$—, —CH$_2$—, or —CH(CH$_3$)—.

* * * * *

UNITED STATES PATENT AND TRADEMARK OFFICE
CERTIFICATE OF CORRECTION

PATENT NO. : 7,556,680 B2  Page 1 of 2
APPLICATION NO. : 11/108109
DATED : July 7, 2009
INVENTOR(S) : Jong-in Lee et al.

It is certified that error appears in the above-identified patent and that said Letters Patent is hereby corrected as shown below:

Column 15, Line 33, change "—CH=CH—,—CH$_2$CH$_2$—,—CH$_2$—," to
-- —CH=CH—, —CH$_2$CH$_2$—, —CH$_2$—,--.

Column 17, Line 25, change "—CH=CH—or—C$_m$H$_{2m}$—," to
-- —CH=CH— or —C$_m$H$_{2m}$—,--.

Column 17, Line 26, change "—CH=CH—or—C$_n$H$_{2n}$—," to
-- —CH=CH— or —C$_n$H$_{2n}$—,--.

Column 18, Line 32, change "us" to --1 is--.

Column 19, Line 25, change "—CH=CH—or" to -- —CH=CH— or--.

Column 19, Line 26, change "—CH=CH—or" to -- —CH=CH— or--.

Column 19, Line 37, change "C$_2$-C20" to --C$_2$-C$_{20}$--.

Column 19, Line 56, change "—CH=CH—,—CH$_2$CH$_2$—," to
-- —CH=CH—, —CH$_2$CH$_2$—,--.

Column 21, Line 6, change "C$_6$-C$_{20}$" to --C$_5$-C$_{20}$--.

Column 21, Line 17, change "—CH=CH—or" to -- —CH=CH— or--.

Column 21, Line 18, change "—CH=CH—or" to -- —CH=CH— or--.

Column 21, Line 19, change "1" to --1,--.

Column 21, Line 33, change "C$_l$-C$_{20}$" to --C$_1$-C$_{20}$--.

Column 21, Line 45, change "C$_3$C$_{20}$" to --C$_3$-C$_{20}$--.

Column 21, Lines 47-48, change "—CH=CH—,—CH$_2$CH$_2$—,—CH$_2$—," to
-- —CH=CH—, —CH$_2$CH$_2$—, —CH$_2$—,--.

Column 22, Line 26, change "—CH=CH—or" to -- —CH=CH— or--.

Column 22, Line 27, change "—CH=CH—or" to -- —CH=— or--.

Column 24, Line 4, change "—CH=CH—or" to -- —CH=CH— or--.

Column 24, Line 5, change "—CH=CH—or" to -- —CH=CH— or--.

Column 24, Line 11, change "-$C_1C_{20}$" to --$C_1$-$C_{20}$--.

Signed and Sealed this

Ninth Day of February, 2010

David J. Kappos
*Director of the United States Patent and Trademark Office*